Jan. 14, 1930.   H. SCHLAICH   1,743,401
ILLUMINATED INDICATING INSTRUMENT
Filed Feb. 13, 1928
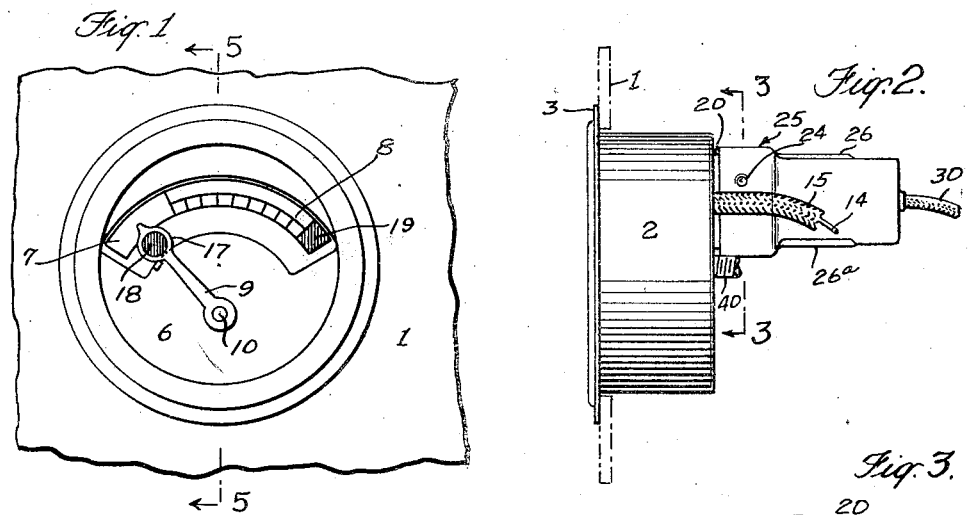
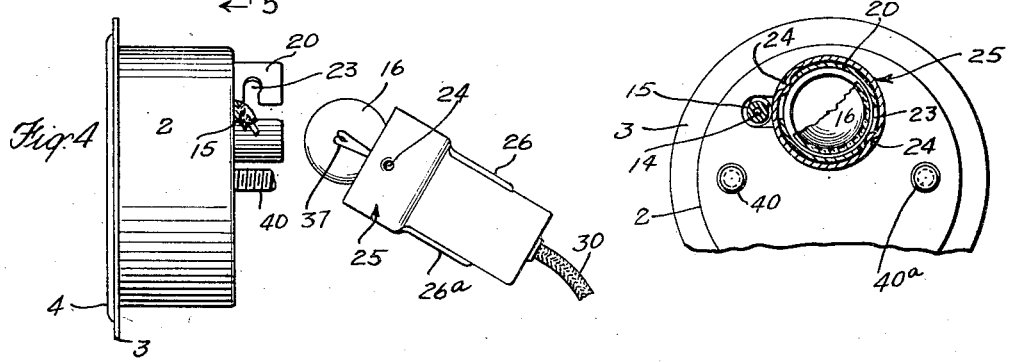
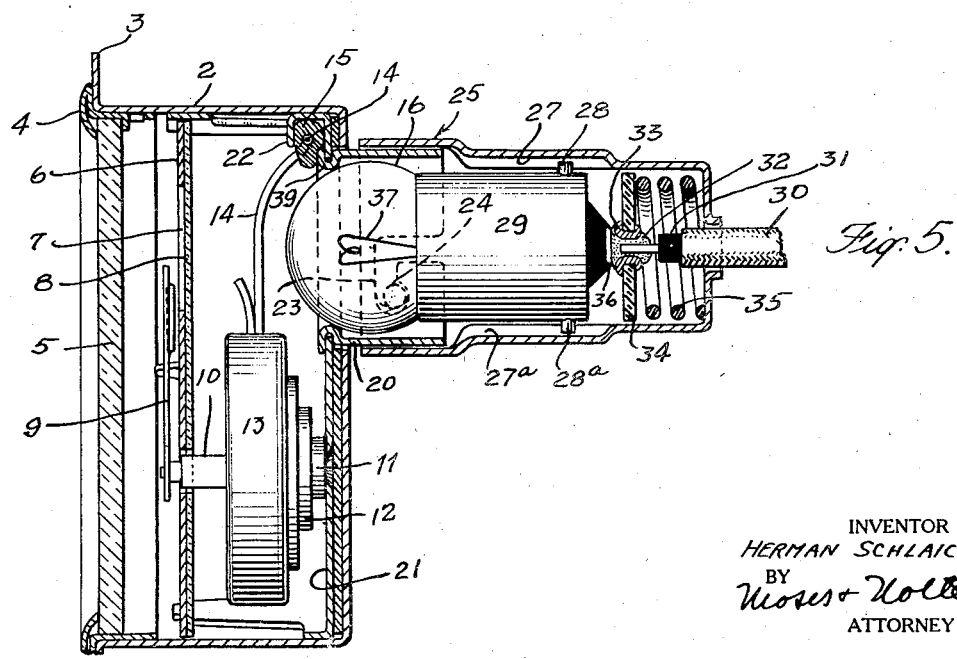
INVENTOR
HERMAN SCHLAICH
BY
ATTORNEY Patented Jan. 14, 1930

1,743,401

UNITED STATES PATENT OFFICE

HERMAN SCHLAICH, OF ELMHURST, NEW YORK

ILLUMINATED INDICATING INSTRUMENT

Application filed February 13, 1928. Serial No. 253,944.

This invention relates to instruments for indicating motor operating conditions to the driver of a motor vehicle, and more particularly to heat responsive instruments of the distance type, as for example, that disclosed in my earlier application Serial No. 145,358, filed October 30, 1926. In said application I have shown an instrument of this character having illuminating means embodied in the indicating part thereof so that the indications can without difficulty be read at night.

More specifically the present invention relates to the provision of means for holding the electric light which are not disclosed in said application and which for some purposes may be regarded as an improvement over the means shown therein, particularly as regards easy detachability taken with absence of vibration and also enhancement of appearance of the unmounted instrument. Other objects of the invention will be apparent as the description proceeds.

In the accompanying drawings to which reference is made for the clear understanding of the invention, Figure 1 shows in front elevation a fragment of a motor vehicle dashboard, and, associated therewith, the casing, dial and pointer of the indicating portions of an instrument embodying the invention;

Figure 2 is a side elevation of the casing, lamp container and lamp container supporting portions of said instrument, with associated wiring, capillary tube and conduit and means for attaching the casing to the dashboard—which latter is indicated by dot-and-dash lines;

Figure 3 is a fragmentary sectional view of the indicator portion of the instrument on the line 3—3 of Figure 2, looking in the direction of the arrows;

Figure 4 is a side elevation, similar to Figure 2, but with the lamp and its container detached from the indicator casing; and Figure 5 is a longitudinal vertical section, on an enlarged scale, on the line 5—5 of Figure 1, looking in the direction of the arrows.

Referring to the drawings, 1 denotes the dashboard of a motor vehicle, in an aperture of which is mounted a cylindrical casing 2, provided with a flange 3, the rear surface of which flange is adapted to abut a bezel 4, supporting a cover glass 5. Mounted behind the glass cover and supported in a cup-like member 21 is a dial 6, preferably stamped from opaque material, and provided with an arcuate opening 7. Adjacent the dial and in the rear thereof is mounted a translucent scale plate 8, provided with suitable graduations. A pointer 9 is adapted to traverse said scale plate. This pointer is attached to and actuated by rotatable shaft 10, horizontally mounted within the casing 2. Attached to the hub 11 of this shaft is the inner end of a compensating spring 12, the outer end of which spring is attached to the inner end of a spiral Bourdon coil 13, wound substantially concentrically around the axis of shaft 10 and attached at its outer end to the casing 2.

The Bourdon coil is connected by a flexible capillary tube 14 (which tube is preferably enclosed in an armored conduit 15) to a bulb, suitably mounted upon the radiator return hose, the radiator cap, or other portion of the circulatory system of a water-cooled motor-vehicle engine. The Bourdon coil, capillary tube and bulb contain a body of fluid which, under variations in heat applied to the bulb, expands and contracts and thereby distorts the Bourdon coil, producing rotary movement of shaft 10 and causing the pointer 9 to traverse the scale plate 8—thereby indicating to the driver of the motor vehicle temperature conditions within the circulatory system.

In order that the indications of the pointer and scale plate may be easily read at night, a lamp 16 is so mounted as to project light through the translucent scale plate 8, thereby illuminating the same for reading purposes. Because of the translucence of the scale plate, the light is so diffused as not to be objectionable to the driver. To further facilitate accurate reading, the pointer 9 is provided with a circular enlargement 17, adjacent its outer end portion, which carries a transparent, colored disk 18. The illumination of this disk by light passing therethrough renders it conspicuous, and thus readily denotes the positon of the pointer with reference to the scale. For the purpose of indicating the limit of clockwise traverse (Fig. 1) of the pointer over the scale plate (which limit, when reached by the pointer, denotes dangerous operating conditions in the engine), a zone 19, at the right-hand end of the arcuate scale may be distinctively marked either by relatively transparent coloring material applied directly thereto, or by superposing thereon a colored transparent disk. When the colored circular disk 18 and the colored zone 19 are in juxtaposition, they will, because of the light shining therethrough, define a characteristic design and serve as a warning signal to the driver.

An important feature of the invention resides in the provision of means whereby the lamp 16 may be securely held in operative position to prevent vibration which, if occurring, would be likely to damage the filament, and whereby a burned-out lamp may be conveniently and readily removed and a new lamp installed in place thereof. In carrying out this feature of the invention, an aperture is formed in the upper rear wall of casing 2 and in a corresponding portion of the rear wall of cup-like member 21 (Fig. 5), which latter member is attached inside casing 2 and serves as a support for dial 6 and scale plate 8; and also, by means of clamps such as 22 (formed in the cylindrical wall of said cup-like member) serves to retain in position the armored conduit 15, carrying the capillary tube 14. A tubular lamp container support 20 is inserted in the aforesaid apertures, and the inner end of the tube is upset and thereby caused to clinch the portion of the wall of member 21 immediately surrounding said aperture. The aforesaid aperturɔs through the walls of casing 2 and member 21 are so positioned that the longitudinal axis of the lamp container support 20 is substantially in alignment with the center of arcuate opening 7 formed in dial 6.

The lamp container support is provided with a plurality of oppositely-disposed bayonet slots 23, (Figs. 4 and 5), adapted to cooperate with depressions 24 formed in the cylindrical wall of a lamp container 25, in order to operatively connect said lamp container and support. Also formed in the cylindrical wall of the lamp container are a plurality of longitudinal ribs 26, 26ª, the inner portions of which form grooves 27, 27ª, adapted to coact with the usual pins or protuberances 28, 28ª, on the outer surface of a lamp-socket 29, in order to accommodate said pins 28, 28ª, and insure good electrical contact of the bulb socket with said container.

One end of a cable 30 is connected to a terminal of a source (not shown) of electrical energy; and the opposite end of the cable enters the lamp container through an aperture formed in the rear wall thereof. The conductor 31 of this cable is held in position (as by a mass of solder forming contact 32) in an eyelet 33, clinched to an insulating disk 34. A coil spring 35 maintains pressure between contact 32 and a contact 36 of the lamp base, thereby insuring electrical connection therebetween. Current flows from one terminal of the source through conductor 31, contact 32, lamp filament 37, and through the shell 29 of said socket to ground.

As is apparent from Fig. 5, the coil spring 35 not only maintains pressure between contact 32 and socket contact 36, but it also serves the function of maintaining the bulb of lamp 16 in pressure contact with a flange 39 formed by the upsetting of the wall of lamp container support 20. Vibration of the lamp is thus minimized, prolonging the life of the filament and obviating objectionable noise which might be caused by rattling. This coil spring serves the further purpose of maintaining tension between depressions 24 and the walls of bayonet slots 23 thereby insuring against accidental displacement of these parts.

It will be understood that the casing 2 may be attached to the dashboard by any well-known means, such as the threaded studs 40, 40ª, in conjunction with a clamping bridge and clamping nuts (not shown), which serve to clamp the dashboard between the flange 3 and such bridge.

The invention thus embodies simple and inexpensive means whereby a lamp employed for illuminating an indicator mounted upon a dashboard may be firmly held in operative position, good electrical contacts in said lamp circuit may be assured, and the removal and replacement of lamps may be readily and conveniently effected.

Furthermore it will be seen that while I have provided a positive connection of the lamp container with the instrument casing, a spring contact is had between the light and the casing. Also it will be apparent that by having the tubular extension of the casing container within the lamp container, and by further having the bayonet slot in the inner of said members, a smooth exterior surface is presented which enhances the appearance of the device.

What I claim is:

1. In an indicating instrument, in combination, a casing, an indicator therein, mechanism in the casing for operating said indicator, a dial having an arcuate, translucent portion extending across the casing behind the indicator, a light bulb for illuminating the translucent portion of the dial from within the casing and having a concentrated source of light therein, and means for supporting the light bulb at the back of the casing but with the forward portion thereof projecting through the casing far enough to permit the light rays to diverge sufficiently to illuminate the translucent portion of the dial substantially uniformly, and permitting said rays to illuminate the rear of said dial directly, said light supporting means consisting of separable members, the forward one of which has an opening of slightly less diameter than the bulb for engaging the bulb, and means for urging the bulb forward so that it projects partially through the opening into the casing.

2. In an indicating instrument, in combination, a casing, an indicator therein, mechanism in the casing for operating said indicator, a translucent plate between the indicator and said mechanism, a frame in the casing supporting all of the parts named, an electric bulb for illuminating the translucent plate from within the casing, and a light housing carried by the frame, said housing comprising a forward member permanently secured to the frame and projecting rearwardly through an opening in the casing, and a rear member detachably connected to the forward member.

In testimony whereof I have affixed my signature to this specification.

HERMAN SCHLAICH.